(12) United States Patent
Meijer et al.

(10) Patent No.: US 7,657,493 B2
(45) Date of Patent: Feb. 2, 2010

(54) RECOMMENDATION SYSTEM THAT IDENTIFIES A VALUABLE USER ACTION BY MINING DATA SUPPLIED BY A PLURALITY OF USERS TO FIND A CORRELATION THAT SUGGESTS ONE OR MORE ACTIONS FOR NOTIFICATION

(75) Inventors: Henricus Johannes Maria Meijer, Mercer Island, WA (US); William H. Gates, III, Medina, WA (US); Raymond E. Ozzie, Seattle, WA (US); Gary W. Flake, Bellevue, WA (US); Thomas F. Bergstraesser, Kirkland, WA (US); Arnold N. Blinn, Hunts Point, WA (US); Christopher W. Brumme, Mercer Island, WA (US); Lili Cheng, Bellevue, WA (US); Michael Connolly, Seattle, WA (US); Nishant V. Dani, Redmond, WA (US); Dane A. Glasgow, Medina, WA (US); Daniel S. Glasser, Mercer Island, WA (US); Alexander G. Gounares, Kirkland, WA (US); James R. Larus, Mercer Island, WA (US); Matthew B. MacLaurin, Woodinville, WA (US); Debi P. Mishra, Bellevue, WA (US); Amit Mital, Kirkland, WA (US); Ira L. Snyder, Jr., Bellevue, WA (US); Chandramohan A. Thekkath, Palo Alto, CA (US); David R. Treadwell, III, Seattle, WA (US); Melora Zaner-Godsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 548 days.

(21) Appl. No.: 11/613,930

(22) Filed: Dec. 20, 2006

(65) Prior Publication Data

US 2008/0082467 A1 Apr. 3, 2008

Related U.S. Application Data

(63) Continuation-in-part of application No. 11/536,601, filed on Sep. 28, 2006.

(51) Int. Cl.
  G06F 15/18 (2006.01)
  G06F 17/27 (2006.01)
  G06F 17/30 (2006.01)
  G06F 17/15 (2006.01)
(52) U.S. Cl. .............................. 706/12; 706/61; 707/6; 707/10
(58) Field of Classification Search .................... 706/12
  See application file for complete search history.

(56) References Cited

U.S. PATENT DOCUMENTS 5,263,165 A 11/1993 Janis (Continued)

FOREIGN PATENT DOCUMENTS

WO 2005022826 10/2006

OTHER PUBLICATIONS

Stohr, Recommendation Systems: Decision Support for the Information Economy, 1998.*

(Continued)

*Primary Examiner*—David R Vincent
*Assistant Examiner*—Nathan H Brown, Jr.
(74) *Attorney, Agent, or Firm*—Lee & Hayes, PLLC

(57) ABSTRACT

Personal data mining mechanisms and methods are employed to identify relevant information that otherwise would likely remain undiscovered. Users supply personal data that can be analyzed in conjunction with data associated with a plurality of other users to provide useful information that can improve business operations and/or quality of life. Personal data can be mined alone or in conjunction with third party data to identify correlations amongst the data and associated users. Applications or services can interact with such data and present it to users in a myriad of manners, for instance as notifications of opportunities.

20 Claims, 12 Drawing Sheets

U.S. PATENT DOCUMENTS

| | | | |
|---|---|---|---|
| 5,537,404 | A | 7/1996 | Bentley et al. |
| 6,064,656 | A | 5/2000 | Angal et al. |
| 6,195,683 | B1 | 2/2001 | Palmer et al. |
| 6,209,039 | B1 | 3/2001 | Albright et al. |
| 6,226,260 | B1 | 5/2001 | McDysan |
| 6,341,127 | B1 | 1/2002 | Katsube et al. |
| 6,434,532 | B2 | 8/2002 | Goldband et al. |
| 6,469,991 | B1 | 10/2002 | Chuah |
| 6,496,482 | B1 | 12/2002 | Kubota |
| 6,628,770 | B1 * | 9/2003 | Jain et al. .............. 379/207.14 |
| 6,707,820 | B1 | 3/2004 | Arndt et al. |
| 6,745,224 | B1 | 6/2004 | D'Souza et al. |
| 6,820,070 | B2 | 11/2004 | Goldman |
| 6,917,975 | B2 | 7/2005 | Griffin et al. |
| 6,961,318 | B2 | 11/2005 | Fichou et al. |
| 7,002,926 | B1 | 2/2006 | Eneboe et al. |
| 7,065,041 | B2 | 6/2006 | Sen |
| 2001/0047355 | A1 | 11/2001 | Anwar |
| 2002/0124053 | A1 | 9/2002 | Adams et al. |
| 2003/0093792 | A1 | 5/2003 | Labeeb |
| 2003/0105734 | A1 | 6/2003 | Hitchen et al. |
| 2003/0115105 | A1 | 6/2003 | Lin |
| 2003/0229623 | A1 | 12/2003 | Chang et al. |
| 2004/0076160 | A1 | 4/2004 | Phaltankar |
| 2004/0098456 | A1 | 5/2004 | Kryzanowski et al. |
| 2005/0138419 | A1 | 6/2005 | Gupta et al. |
| 2005/0238024 | A1 | 10/2005 | Taylor et al. |
| 2005/0262132 | A1 | 11/2005 | Morita et al. |
| 2005/0289234 | A1 | 12/2005 | Dai et al. |
| 2006/0020700 | A1 | 1/2006 | Qiu et al. |
| 2006/0031518 | A1 | 2/2006 | Jennings |
| 2006/0036904 | A1 | 2/2006 | Yang |
| 2006/0048224 | A1 | 3/2006 | Duncan et al. |
| 2006/0062161 | A1 | 3/2006 | Tang et al. |
| 2006/0123005 | A1 | 6/2006 | Burnett et al. |
| 2007/0106754 | A1 | 5/2007 | Moore |
| 2008/0154698 | A1 | 6/2008 | Flake |
| 2008/0215428 | A1 | 9/2008 | Ramer |

OTHER PUBLICATIONS

Srivastava, et al., Web Usage Mining: Discovery and Applications of Usage Patterns from Web Data http://www.sigkdd.org/explorations/issues/1-2-2000-01/srivastava.pdf. Last accessed on Nov. 28, 2008, 12 pages.

News Room http://www.democraticmedia.org/book/export/html/28. Last accessed on Nov. 28, 2008, 153 pages.

Letters to the Editor http://letters.computing.co.uk/security/index.html. Last accessed on Nov. 28, 2008, 46 pages.

Brunner, et al. "Disruption Tolerant Networking" Dagstuhl Seminar Proceedings (2005) NEC Europe Ltd., Network Laboooratories, 4 pages.

Fox, et al. "Towards Flexible Messaging for SOAP Based Services" (2004) IEEE, 11 pages.

Gunduz, et al. "A Framework for Aggregation Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29 , Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/pdf&identifier=oai:arXiv.org:cs/0502091. Last accessed Sep. 20, 2006.

* cited by examiner

RECOMMENDATION SYSTEM THAT IDENTIFIES A VALUABLE USER ACTION BY MINING DATA SUPPLIED BY A PLURALITY OF USERS TO FIND A CORRELATION THAT SUGGESTS ONE OR MORE ACTIONS FOR NOTIFICATION

CROSS-REFERENCE TO RELATED APPLICATION

This application is a continuation-in-part of U.S. patent application Ser. No. 11/536,601, filed Sep. 28, 2006 and entitled PERSONAL DATA MINING, incorporated herein by reference.

BACKGROUND

Computers and computer related technology have evolved significantly over the past several decades to the point where vast amounts of computer readable data is being created and stored daily. Digital computers were initially simply very large calculators designed to aid performance of scientific calculations. Only many years later had computers evolved to a point where they were able to execute stored programs. Subsequent rapid emergence of computing power produced personal computers that were able to facilitate document production and printing, bookkeeping as well as business forecasting, among other things. Constant improvement of processing power coupled with significant advances in computer memory and/or storage devices (as well as expediential reduction in cost) have led to persistence and processing of an enormous volume of data, which continues today. For example, data warehouses are now widespread technologies employed to support business decisions over terabytes of data.

The sheer volume of collected data made it nearly impossible for a human being alone to perform any meaningful analysis, as was done in the past. This predicament led to the development of data mining and associated tools. Data mining or alternatively knowledge discovery relates to the process of exploring large quantities of data in order to discover meaningful information about the data that is generally in the form of relationships, patterns and rules. In this process, various forms of analysis can be employed to discern such patterns and rules in historical data for a given application or business scenario. Such information can then be stored as an abstract mathematical model of the historical data, referred to as a data-mining model (DMM). After the DMM is created, new data can be examined with respect to the model to determine if the data fits a desired pattern or rule.

Conventionally, data mining is employed by large corporations to understand complex business processes. This can be achieved through discovery of relationships or patterns in data relating to past behavior of a business process. Such patterns can be utilized to improve the performance of a process by exploiting favorable and avoiding problematic patterns. Examples of business processes where data mining can be useful are customer response to advertisement, energy consumption, sales prediction, product association and risk assessment. In each of these examples, data mining can reveal which factors affect outcome of a business event or process and patterns relating the outcome to these factors. Such patterns increase understanding of these processes and therefore ability to predict and affect outcome.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to personal data mining. More specifically, data mining technologies can be applied to personal user data provided by users themselves, gathered by others on their behalf and/or generated and maintained by third parties for their benefit or as required. Mining of such data can enable identification of opportunities and/or provisioning of recommendations to increase user productivity and/or improve quality of life. Further yet, such data can be afforded to businesses involved in market analysis, or the like, in a manner that balances privacy issues of users with demand for high quality information from businesses.

In accordance with an aspect of this disclosure, personal user data can be received or otherwise acquired from a plurality of local and/or remote data repositories. Data mining techniques can then be applied to the personal user data across a plurality of users, for example, to identify patterns, relations and/or correlations amongst the data. Subsequently or concurrently, mining results and/or useful information based thereon can be provided to a user in accordance with either or both of a push and pull data distribution model.

According to still another aspect of the disclosure, at least a portion of the innovation can be provided by or as a cloud service. In this manner, a collection of network resources can be utilized to gather, mine and present results to authorized entities over substantially any device anywhere.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Provided herein are systems and methods associated with mining personal user information. More specifically, correlations between personal data associated with a plurality users can be determined and employed to identify and present opportunities to increase productivity and/or quality of life. In addition to benefits provided to individual users or groups thereof, such personal information can prove invaluable to businesses engaged in market analysis and can be provided thereto in a manner that protects user privacy. Still further yet, opportunities exist to utilize aspects of the innovation to generate and deliver targeted advertisements to users.

Various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
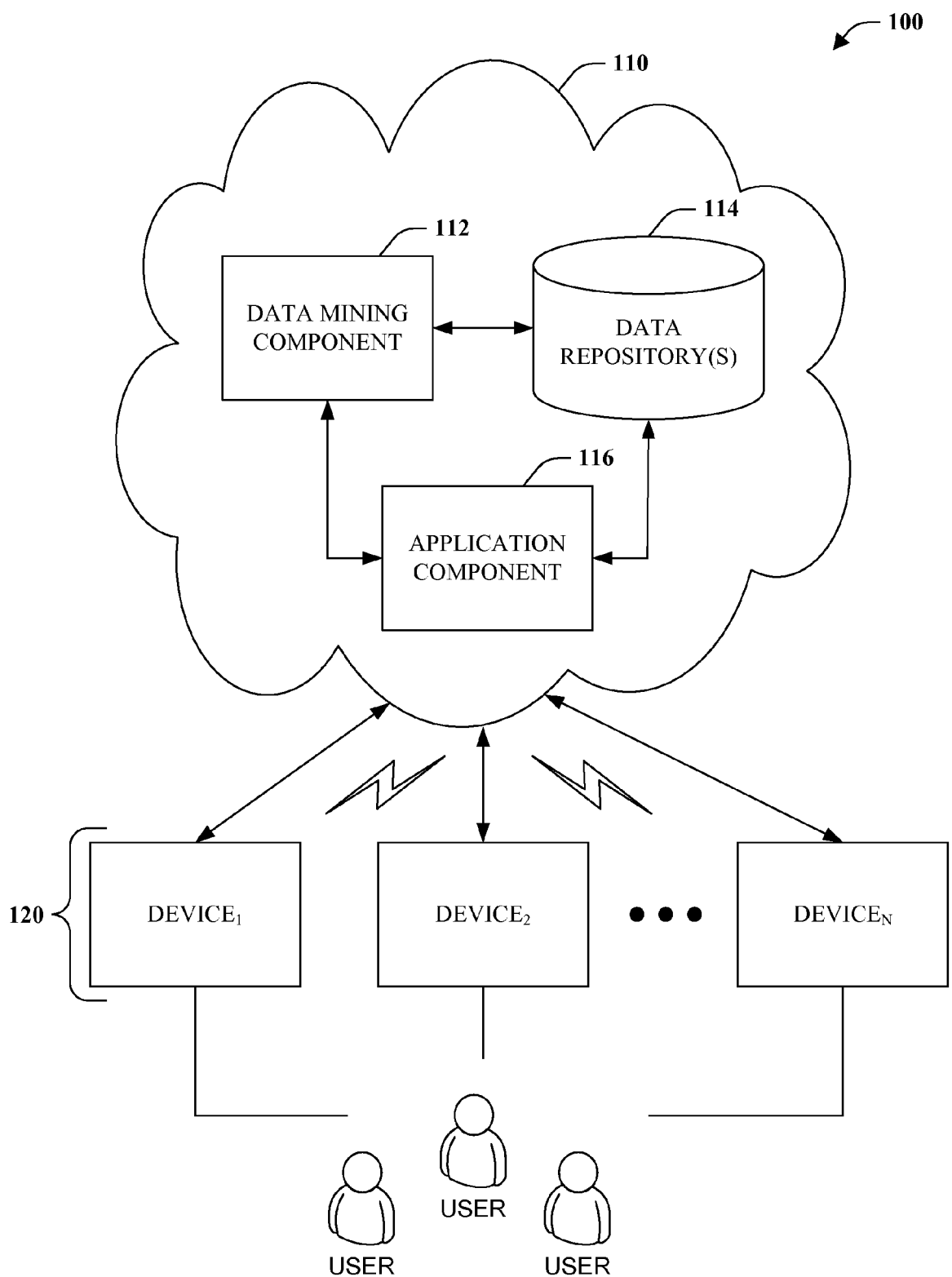
FIG. 1 is a block diagram of personal data mining system.

Referring initially to FIG. 1, a personal data mining system 100 is depicted in accordance with an aspect of the disclosure. The system 100 can be embodied by a collection of components that form a cloud-based personal data mining service 110. The service 110 can be accessible to users over a wide area network (WAN) such as the Internet via one or more computers or computing devices 120 (DEVICE$_1$ through DEVICE$_N$, where N is greater than or equal to one). Such devices include, without limitation, thin client devices (e.g., computer terminal, mobile device . . . ) and/or devices owned by someone other than the user.

Conventionally, most computing undertaken by consumers, including creation, manipulation and maintenance of data is performed on client machines and/or servers that are maintained by owners of the client machines. For example, an organization can comprise a server and personal computers for each member thereof. The computers can be loaded with several applications, such as web-browsing applications, word-processing applications and the like. Data created through use of the applications can be retained upon a server that is accessible by the client through an intranet, wherein the server is maintained by the organization or an IT company hired by the organization. Continued improvements in robustness and reliability associated with network connectivity, suggest that a different model can be utilized in place of the conventional client/intranet-based architecture.

In particular, a computing model/architecture that utilizes thin clients and robust computing resources that are maintained off-premise (e.g., third party) and are accessible over a WAN such as the Internet. In such a computing model, a collection of hardware and/or software resources, also known simply as the cloud, can be utilized to provide applications and/or services, store data, process data and maintain data security, inter alia. This relieves end users of being forced to perform various tasks, including installing several applications on multiple computers, maintaining security with respect to each computer, purchasing hardware for a server for increased storage and other laborious tasks.

Here, the cloud-based service 110, or simply cloud service 110, can provide functionality for personal data mining. The service 110 can include a data mining component 112 and data repository(s) 114. The data mining component 112 provides a mechanism for identifying or uncovering implicit, previously unknown, and potentially useful information from the data housed in the communicatively coupled data repository(s) 114. For example, the data mining component 112 can unearth patterns and/or correlations amongst user data and/or users themselves. The data mining component 112 can employ a single or combination of analysis techniques including, without limitation, statistics, regression, neural networks, decision trees, Bayesian classifiers, Support Vector Machines, clusters, rule induction, nearest neighbor and the like to locate hidden knowledge within data. In one instance, a data-mining model is built and trained. Subsequently, the trained model is employed to identify patterns and/or correlations. Additionally or alternatively, it should be appreciated that the data mining component 112 can execute third-party algorithms (e.g., plug-ins) and/or user defined rules specifying correlations of interest.

The data repository(s) 114 is operable to store personal user data associated with a plurality of users. In one instance, such data can include data generated by a user, owned by a user or otherwise linked thereto. By way of example, this data can include but is not limited to personal management information (PIM data), pictures, videos, documents, e-mail, instant messages, addresses, calendar dates/scheduling information (e.g., birthdays, anniversaries, appointments . . . ), voice mail, phone logs, RSS feeds, subscriptions, bookmarks, mail lists, project management features, computing device data, tasks and location data. In one instance, such data can be supplied by individual users via one or more devices 120. Additionally or alternatively, user data can be provided by third parties such as purchase data, identity data, web interaction, etc.

Application component 116 facilitates interaction with users and user devices 120. The application component 116 is communicatively coupled to data mining component 112 and data repository(s) 114. Accordingly, the application component 116 is able to retrieve and/or store personal data with respect to the data repository(s) 114. Furthermore, the application component 116 can support receiving and/or retrieving data mining results and provisioning them to users in a myriad of manners, as described in later sections herein. The application component 116 is also operable to apply an additional level of processing to data mining results to interpret the results and provide users with useful information.

There are various exemplary scenarios in which the subject personal data mining system 100 can be utilized. By way of example and not limitation, based on a user's determined interests and correlations of other users' interests, suggestions or recommendations can be made with respect to books to read, movies or plays to see and/or places to visit, among other things. Furthermore, the data mining system 100 can relate to groups and/or groups of participating users. In one instance, correlations can be made to aid a user in selection of a social network, user group, or other like group to join. By way of example, recommendations can be made to join particular groups when a user moves to a different city. Similarly, correlations can be made to increase organization efficiency. For example, the mining system 100 can identify others who are working on the same or similar project of which you are unaware. A user notified of such information can then seek out the individual to consult with regarding a project to, perhaps, eliminate duplicative work. It is also to be appreciated that the system can be employed by businesses in conjunction with performance of market analysis, inter alia.

Another exemplary application of personal data mining can be to improve searching and more particularly, ranking of search results. Very often searching requires several attempts.

For instance, a query might ask "What is the best digital camera and where I can find the cheapest one?" Personal data mining can be employed to improve the process by having the search engine "learn" from previous searches.

In yet another exemplary application of personal data mining, the application can identify a repetitive task and suggest that the task be automated. Such a suggestion can also be accompanied by useful information associated with the suggestion such as a pointer or reference to a utility to facilitate task automation.

Note also that system 100 can be identity centric rather than device centric. In one implementation, all or substantially all personal user information can be stored in the cloud, for instance housed in data repository(s) 114. For example, the data can be provided and maintained by a network-based personal information management service or other like service(s). In this scenario, a user can designated all or a portion of content to be mined, for instance via interaction with the mining application component 116. Furthermore, the user may not only designate what data can be mined, but by whom the data can be mined. Users can be provided with benefits to make the data available (e.g., payments, incentives . . . ). Moreover, generated mining results or useful information based thereon can be provided to a user over substantially any device. More specifically, user identity can be authenticated based on a plurality of mechanisms such as user name and pass code, biometrics, third party certification, and reputation. Such functionality can be performed by the application component 116 or other designated component (not shown). Once a user is authenticated, he/she can receive and/or retrieve mining authorized results via a currently employed device 120. Useful information can therefore be provided to users over substantially any device anywhere.

Figure 2:
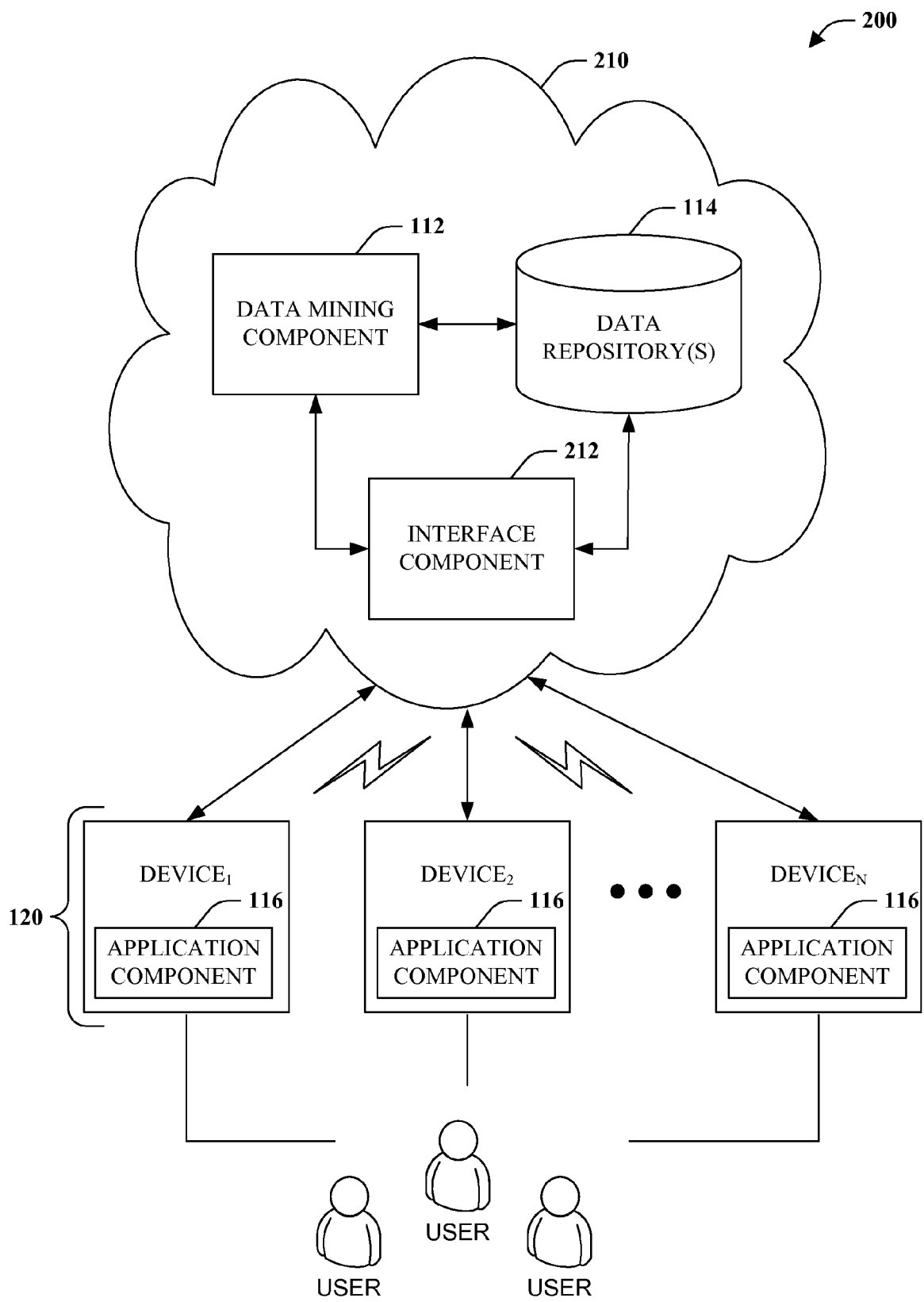
FIG. 2 is a block diagram of a personal data mining system that employs resources of user devices.

FIG. 2 depicts another personal data mining system 200 in accordance with an aspect of the disclosure. Similar to system 100 of FIG. 1, system 200 can facilitate provisioning of useful information based at least in part on results of data mining techniques applied to personal data associated with a plurality of users. However, system 200 divides processing between the cloud 210 and the client devices 120. More specifically, the personal data mining cloud-based service 210 includes the data mining component 112 and data repository(s) 114 as previously described with respect to FIG. 1. In brief, the data mining component 110 can analyze personal user data housed in the data repository(s) 114 to discover patterns, correlations or the like amongst the data.

The service 210 also includes an interface component 212 communicatively coupled to the data mining component 112 and the data repository(s) 114 and operable to facilitate communication between the components 110 and 114 and the device resident application component 116. Accordingly, the interface component 212 can be embodied as an application programming interface (API) or the any like mechanism that affords a communication bridge between disparate and remotely located components.

The application component 116 enables interaction with service components 210 by users or more particularly devices 120 employed by the users, among other things, as previously described. In contrast to system 100, the application component 116 is embedded within the devices 120. In this manner, devices can be more than thin clients and contribute to the system via execution of the application component 116. More specifically, the application component 116 can provided and receive data from data mining component 112 and the data repository(s) 114 and facilitate affording useful information to users. For example, the application component 116 can capture and provide at least a subset of personal data from a device store to the data repository 114. Subsequently, data mining results such as patterns or correlations can be received, retrieved or otherwise acquired from the data mining component 112 and provided to a user or third party.

It should be appreciated that while the application component 116 can be resident in the cloud or on a device as shown in FIGS. 1 and 2, a hybrid is also possible. In particular, the application component 116 or portions thereof can be distributed across both the cloud and the device. Processing of portions of application code can then be accomplished via either mechanism depending on context to maximize efficient execution and/or throughput. For example, a cloud-based application component 116 can designate a portion of the application for execution on a device 120 where resources are available and parallel execution possible to optimize performance.

Figure 3:
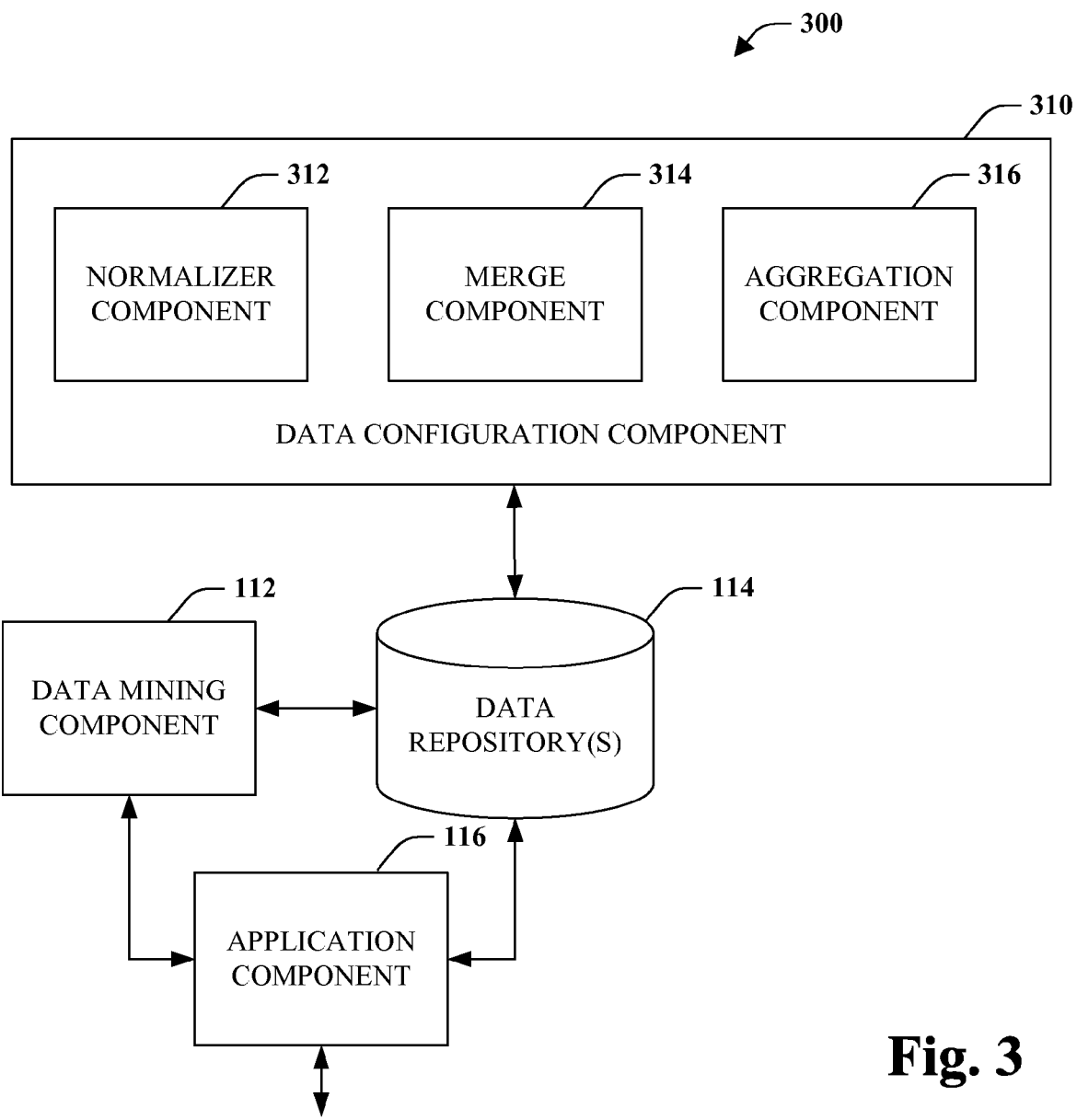
FIG. 3 is a block diagram of a data mining cloud-based service.

Turning attention to FIG. 3, a cloud-based service 300 is illustrated in accordance with an aspect of the disclosure. The cloud-service 300 can be employed with the systems 100 and 200 of FIGS. 1 and 2. Similar to services 110 and 210 of systems 100 and 200, respectively, service 300 can include the data mining component 112, data repository(s) 114 and application component 116, as described supra. Additionally, the service 200 includes a data configuration component 310 communicatively coupled to the data repository(s) 114. The component 310 is a mechanism for configuring and/or preparing data for mining operations by the data mining component 112. In particular, the data configuration component 310 can include normalizer component 312, merge component 314 and aggregation component 316.

The normalizer component 312 is a mechanism for normalizing or standardizing data formats to optimize mining over such data. While a single taxonomy could be forced on users, the subject innovation can also be flexible enough to allow a plurality of classifications schemes to be employed by users. Accordingly, users may decide to use disparate taxonomies based on their comfort level or generate their own. Once a user selects a classification, he/she can then tag data accordingly either manually or automatically. The normalizer component 312 can map differing classifications and tags to a standard system. As a result, the data mining component 112 need only operate over a single standard taxonomy, although it is not limited thereto. Additionally, the normalizer can cleanse data tags and information of typographical, formatting or other errors to facilitate optimized mining.

The merge component 314 merges third-party personal data with user-supplied data. Typically, users are the best source of information about themselves. However, in some instances users may employ others to provide personal information. Additionally, users' actions and/or interactions with entities may also provide valuable information about them. For example, a user can employ a mobile device, such as a phone, that identifies and records user geographical location for various services like navigation. Likewise, purchases are tracked and saved by stores. These and other types of information can be made accessible in a cloud by entities and can be utilized in mining operations.

Figure 4:
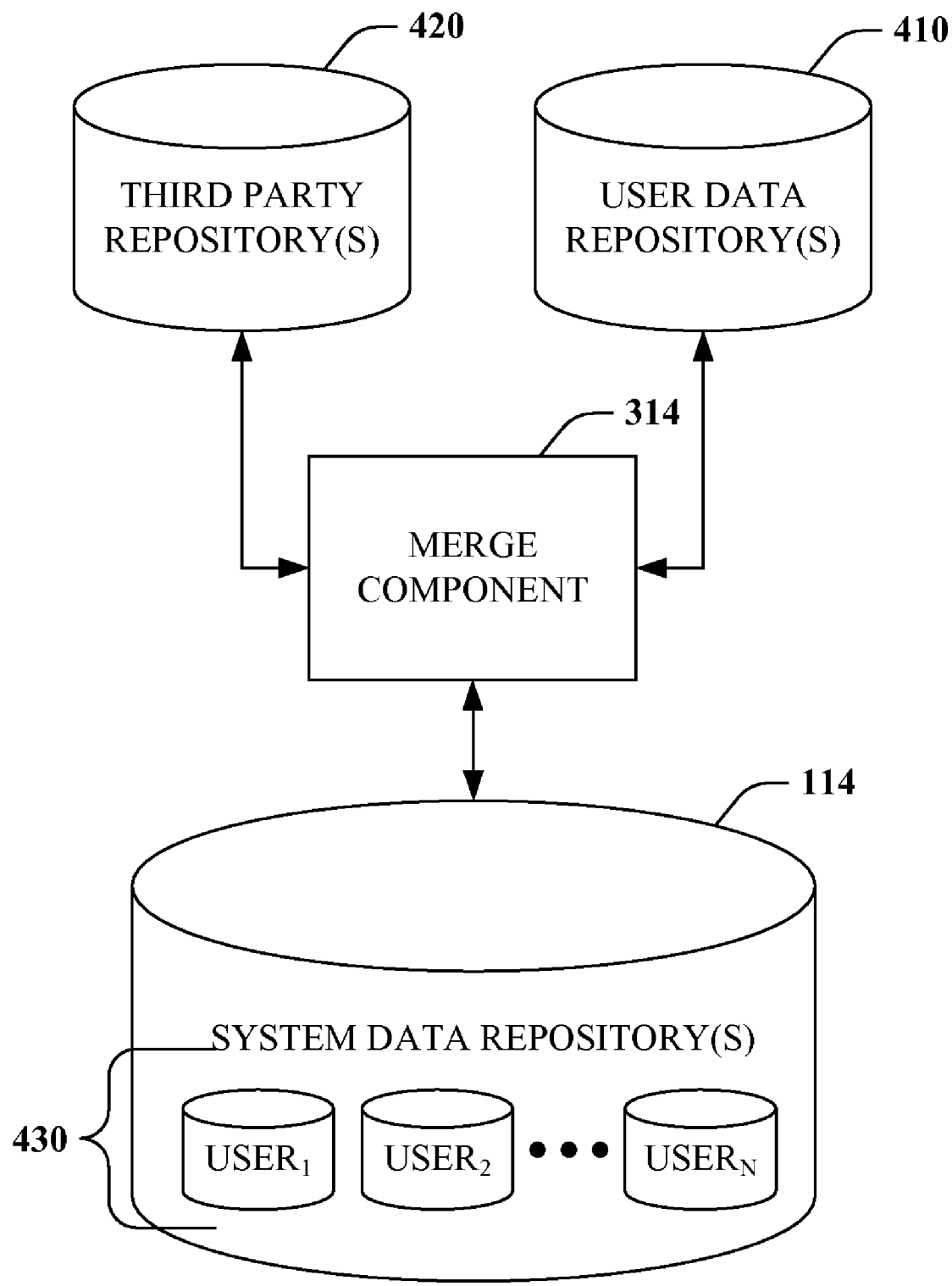
FIG. 4 is a block diagram of a system that merges personal user data.

Turning briefly to FIG. 4, a system that merges user data 400 is illustrated to facilitate clarity and understanding. As shown, the merge component 314 is communicatively coupled to a user data repository(s) 410, third party repository(s) 420 and system data repository(s) 114. While illustrated separately it should be appreciated that at least a subset of the data stores can be part of a single repository. The user data repository(s) 410 can include data provided by users. In one instance, the data repository(s) 410 can be associated with multiple client devices and/or be network based.

The third-party repository(s) 420 can collect data about users based on their actions or interaction, among other things. The third-party repository(s) 420 can be associated with an entity store such as a company and be network accessible via the cloud. For example, the third-party repository(s) 420 can identify goods and/or services purchased by particular users based on a single or federated identity. The merge component 314 can receive, retrieve or otherwise obtain data from either or both stores and merge them into system data repository(s) 114. In particular, data can be segmented with respect to particular uses in stores 430. The data mining component 112 can mine personal data across the user stores 430 to discover useful information. Furthermore, the normalizer component 410 can be employed to insure data from both the user data repository(s) 410 and the third-party repository(s) 420 is mapped to a standardized form to optimize mining.

Returning to FIG. 3, the data configuration component 310 also includes the aggregation component 316. The aggregation component 316 is operable to aggregate personal user data at various levels of granularity. Such aggregation can provided different views of mined data and/or preserve user privacy, among other things. While the mining system disclosed herein can be utilized amongst a group of trusted individuals, it is also applicable in other situations or scenarios. In particular, personal information can be extremely valuable to businesses, marketing firms and the like, which can provide a revenue stream for the subject innovation. This may cause some users to be hesitant to use the system or provide information of little or no apparent value. However, the aggregation component 316 can ensure individual user privacy by aggregating data across users and mining over this aggregated data. In this case, provided results would be based on the fact that a certain number of users prefer product A over product B, rather than user A utilizes product A and user B likes product B, for example. This information can still provided valuable results while also preserving user privacy and promoting system utilization.

Figure 5:
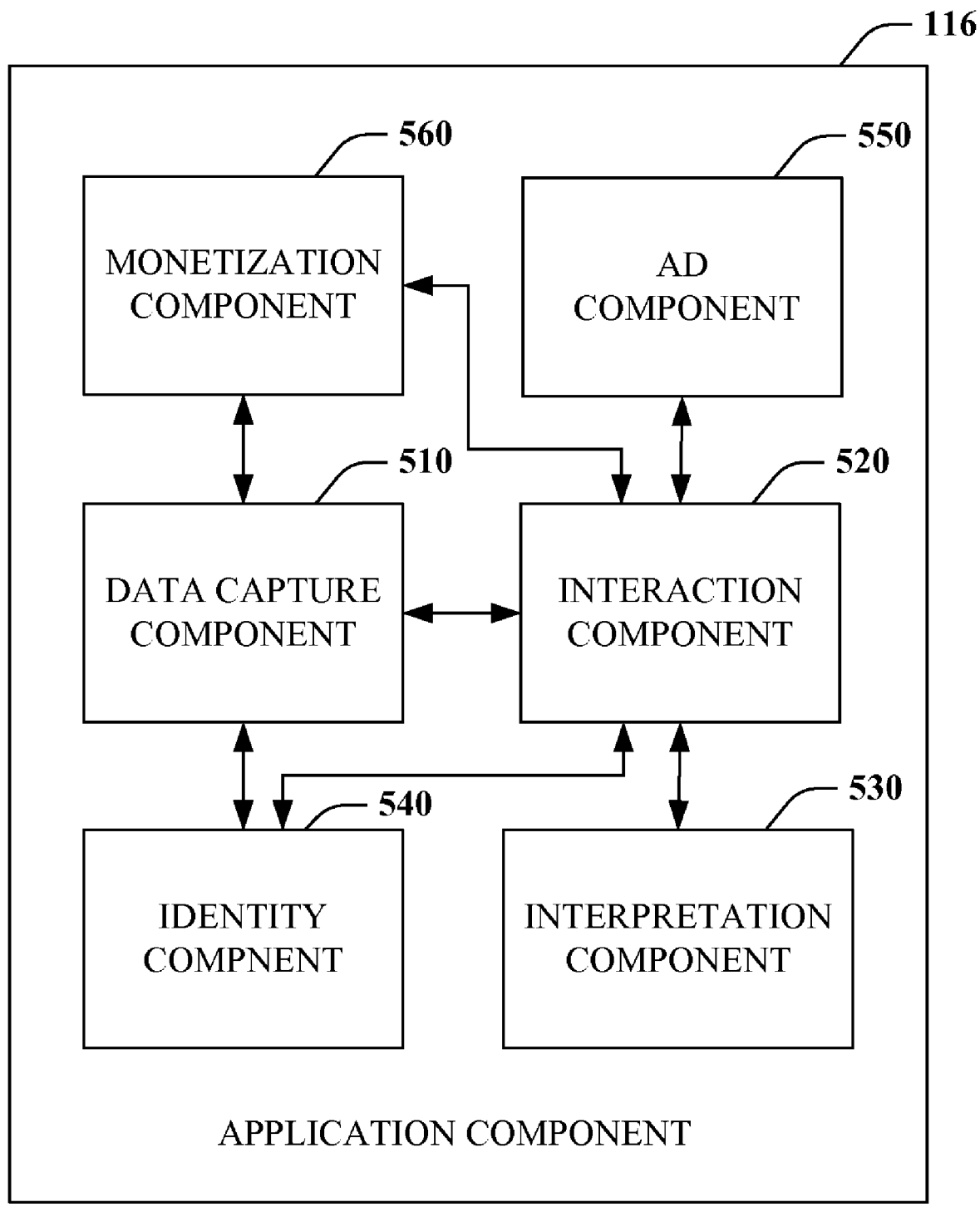
FIG. 5 is a block diagram of a representative application component.

Referring to FIG. 5, a representative application component 116 is depicted in accordance with an aspect of the disclosure. As previously described, the application component 116 is a mechanism that supports user interaction with the data mining component 112 and data repository(s) 114 of FIGS. 1-3. The application component includes a data capture component 510, interaction component 520 interpretation component 530, identity component 540 and ad component 550.

Figure 6:
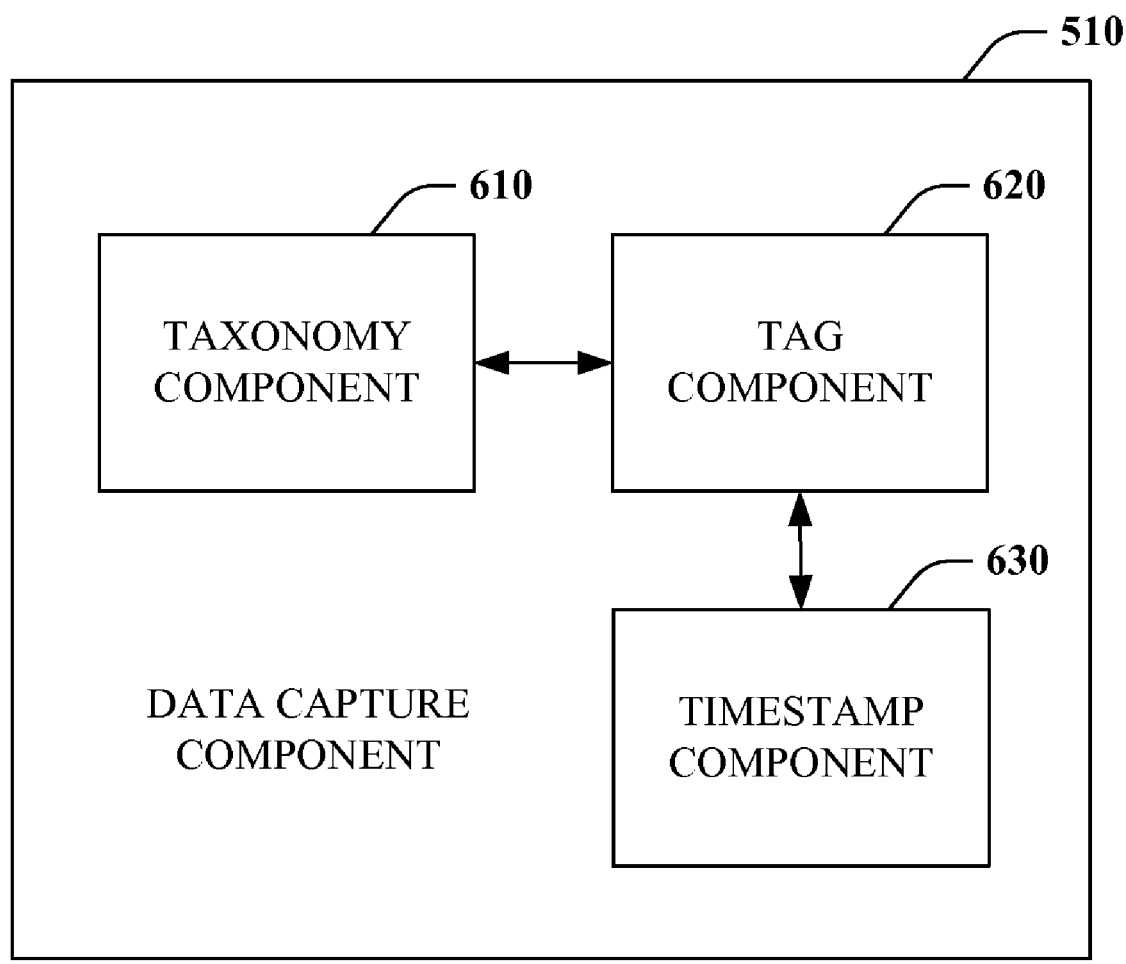
FIG. 6 is a block diagram of a representative data capture component.

The data capture component 510 captures personal user data and provides it to the data repository(s) 410. The data capture component 510 can also provide a plurality of functionality related to data to be provided to the data repository(s) 410. Turning to FIG. 6, a representative data capture component 510 is illustrated in accordance with an aspect of the disclosure. The component includes a taxonomy component 610 that provides standardized taxonomies for employment and/or supports generation of a custom taxonomy in a manner that can facilitate mapping to a standard format for mining. The taxonomy can also correspond to a folksonomy, which is a collaboratively generated and open-ended classification. In other words, the taxonomy emerges from shared tagging practices amongst a plurality of users over time. If a map to from a taxonomy to a standard taxonomy employed by the mining component 112 does not exist, the component 510 is operable to generate such a map utilizing standard algorithms in the industry and/or machine learning techniques.

Also included as part of data capture component 510 is a tag component 620 communicatively coupled to the taxonomy component 610. The tag component 620 provides a mechanism for tagging data in accordance with a particular taxonomy as prescribed by the taxonomy component 610. In one instance, tag component 620 can provide a means for tagging information manually or semi-manually. Additionally or alternatively, the tag component 620 can support tagging data automatically. Among other things, machine learning and/or artificial intelligence based mechanisms can be employed to automatically tag data in accordance with a particular taxonomy. For example, inferences can be made based on data content, metadata and the like to determine proper tagging in view of a taxonomy.

A timestamp component 630 is also provided by the data capture component 510. The timestamp component 630 associates time (e.g., seconds, minutes, hours, day, month, year . . . ) with captured data items. This time can form part of metadata associated with data, for instance. The time can be the time the data was captured and/or any other reasonable time that can be associated with the data. For example, if the data corresponds to a picture the time metadata can be linked to the picture as of the time it was captured and/or any time that can be determined or inferred from the image upon image analysis or the like. In another example, if the data corresponds to a scheduled event, the time of the event can be associated with the data as a tag or metadata. The timestamp component 630 thus enables a sequence of personal data to be created with respect to individual users to enable discovery and provisioning of time relevant or dependent information.

Returning to FIG. 5, the application component includes an interaction component 520 that is communicatively coupled to the data capture component 510. The interaction component 520 facilitates receiving or retrieving data from or providing data/information to individuals. For example, the interaction can facilitate tagging of data and identification a subset of data to be captured. Additionally or alternatively, the data mining results or useful information related thereto can be presented to a user via the interaction component 520. In one instance, the interaction component 520 can provide a graphical user interface (GUI) over a network, such as the Internet, or on a device to enable easy interaction.

Figure 7:
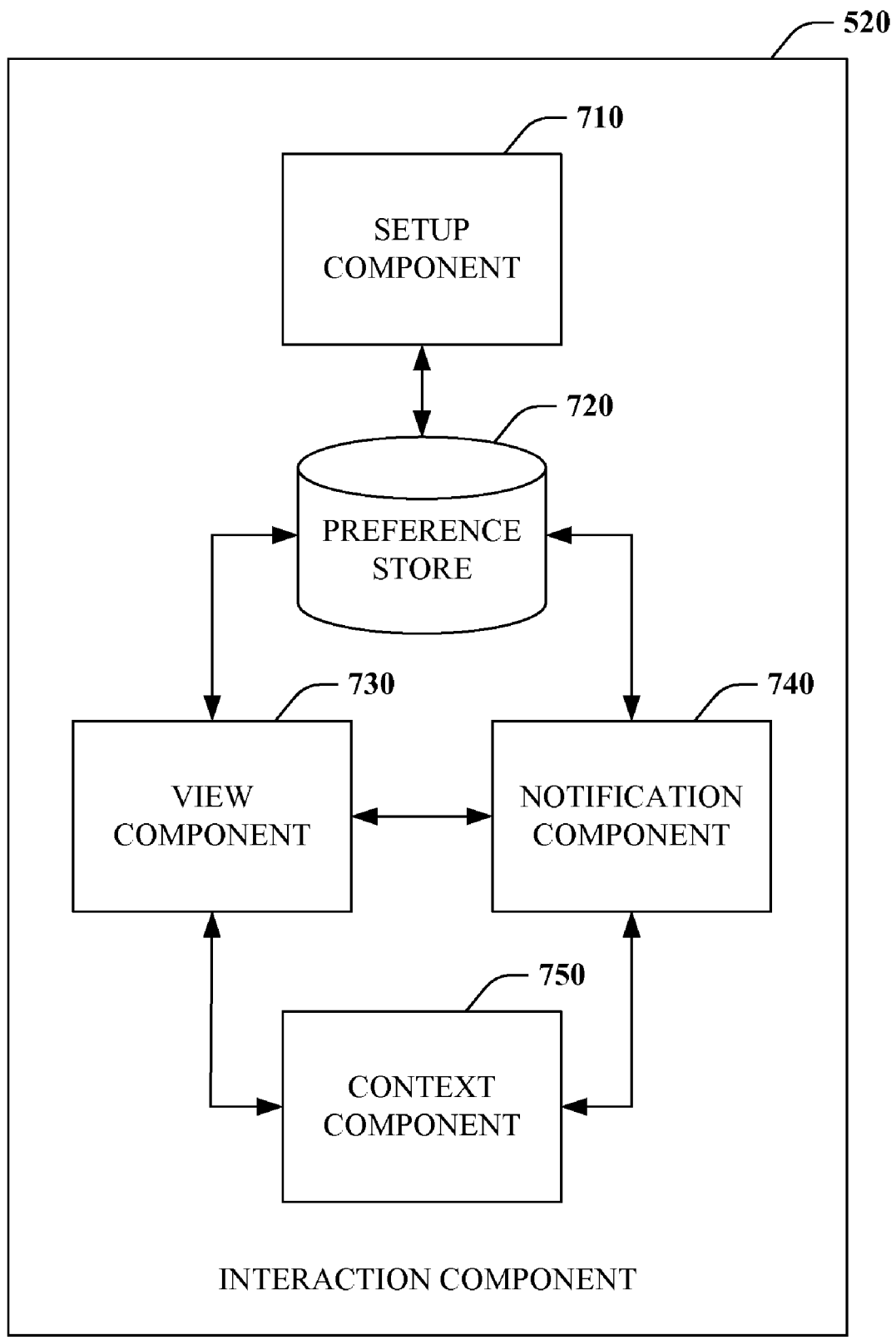
FIG. 7 is a block diagram of a representative interaction component.

Turning attention to FIG. 7, a representative interaction component 520 is depicted in accordance with an aspect of the disclosure. Component 520 includes a setup component 710 that enables individuals to establish, modify or delete preferences with respect to receiving or otherwise interacting with data or information. Such data can be housed in communicatively coupled preference store 720, representative of a computer readable medium or article of manufacture.

View component 730 can present data mining results such as patterns and correlations or other useful information to individuals. The style and content associated with such presentation can be governed by defined preferences located in the preference store 720. For example, content associated with particular interests can be presented in a graphical format alone or in combination with text, sound and/or video. Additionally, the view component 730 can support searches for particular information or other interactive requests. Still further yet, the view component 730 can monitor interaction with data and learn preferences, which can be persisted to the preference store 720 to allow individuals to easily navigate information that is important to them.

The interaction component 520 also includes a notification component 740 that notifies users of mining results and/or useful information based thereon. The notification component 740 can retrieve and respect notification preferences set by a user. For instance, preferences can dictate the subject matter for which notifications are to be provided and how they are provided. By way of example, a preference can be set to notify a user of information with respect to a particular work task by email. Furthermore, the notification component 740 can employ rule-based logic and/or machine learning mechanisms to determine if and how to notify a user. For example, a determination can be made as to whether the value of the information is greater than the cost of interrupting the user and if so which method of notification would be appropriate (e.g., pop-up, e-mail, text message, voice message, page . . . ) over which device (e.g., computer, mobile phone, personal digital assistant, home phone . . . ). Furthermore, the notification can provide a link to initiate a view provided via view component 740.

Context component 750 can be communicatively coupled to both the view component 730 and the notification component 740. The context component 750 can receive, retrieve or otherwise obtain or acquire context information and provide such information to components 730 and/or 740. The context information can include any data not accounted in the data mining processes. For example, the context information can include real-time location information. By way of example, if it is determined that an unknown co-worker is working on a similar project as the user and the user and co-worker are determined to be in close proximity to one another then a notification, such as text message, can alert the user and provide such information. It is to be appreciated that other context information can also be employed including current time, current events, traveling speed, among other things. For instance, it can be determined that a user is traveling in his/her vehicle based on historical information, day, time and speed/acceleration associated with the user or vehicle. With this information, the appropriate notification device can be selected (e.g., car or mobile phone) and the notification sent at a suitable time (e.g., when the vehicle is stopped).

Returning to FIG. 5, the application component 116 can also include an interpretation component 530 communicatively coupled to the interaction component 520. Interpretation component 530 can provide an additional layer of processing to data mining results to interpret, construe or infer information from such results. For instance, if mining results indicate a correlation between users who prefer one product and users that prefer another, such data can be interpreted to provide a suggestion to a user to try the other product based on the correlation. This aids a user in that they do not need to try to make sense of often obscure data mining results. Such functionality can be provided by the interpretation component 530 via logic rules and/or machine learning mechanism, among other things. Intelligible results can then be provided to individuals through the interaction component 520.

Also included by the application component 116 is an identity component 540 that can authenticate/authorize users. The identity component 540 can employ a plurality of means to authenticate a user including but not limited to user name/pass code and biometrics (e.g., retina scan, fingerprint, handprint, scent, voice recognition, typing pattern . . . ). Further, third party certification entities can be employed to assist in authenticating a user. Still further yet, authentication can be predicated on user reputation and/or recent actions, inter alia. Once a user identity can be established within a threshold degree of confidence, such identity can be provided to the data capture component and/or interaction component to authorize use. For example, the identity can be associated with particular data that can be provided to the service for mining. Further, the information and use thereof can be limited by the interaction component 522 based on identity. These identities can also be utilized to form groups members of which have permissions to access and/or utilize certain information, for instance for mining.

Still further yet, the application component 116 can include an ad component 550 that facilitates advertisement injection. More specifically, advertisements can be provided together with provisioning of mining data or the like via the interaction component 520. It should also be appreciated that users of different versions of the data mining service, or more particularly application component 116, can be provided with differing experiences. For example, a free version of such a service can allow advertisers to inject advertisements during interaction with data such as through a view or notification, inter alia. Additionally or alternatively, advertisers, marketers or the like can be authorized to access much more personal information that can be used for analysis and/or highly tailored advertisements through the system or other means.

In one embodiment, advertisers can submit advertisements and targeted demographic information, criteria or the like, and the ad component 550 can provide ads to particular users based on all or a subset of personal information. More specifically, ads can be matched to users satisfying advertiser specified criteria to enable advertisements to be highly tailored or targeted to particular users. Further, the system or service can act as a proxy or buffer such that personal information can be utilized, but not provided to unauthorized entities, thereby protecting user privacy.

Additionally, the application component 116 can include a monetization component 560. In accordance with an embodiment of the disclosure, at least a subset of personal user information can be sold to third parties such as advertisers. In one instance, at least a portion the revenue can be provided to a user to allow a user benefit from data mined on their behalf. The monetization component 560 provides a mechanism for selling information and distributing funds. For example, the monetization component 560 could initiate an auction to sell information to the highest bidder. The monetization component 560 is communicatively coupled to the data capture component 510 and the interaction component 520 to facilitate retrieval of personal data and sale thereof. In particular, a user via the interaction component 520 can designate particular information for sale or alternatively protect certain information. Additionally, the user may designate to whom the information can be sold and how to will be used.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such mechanisms can be employed to facilitate distributed application processing, normalization of data, automatic tagging of data in accordance with a taxonomy, normalization of data, generation of views and notifications and interpreting data mining results.

Figure 8:
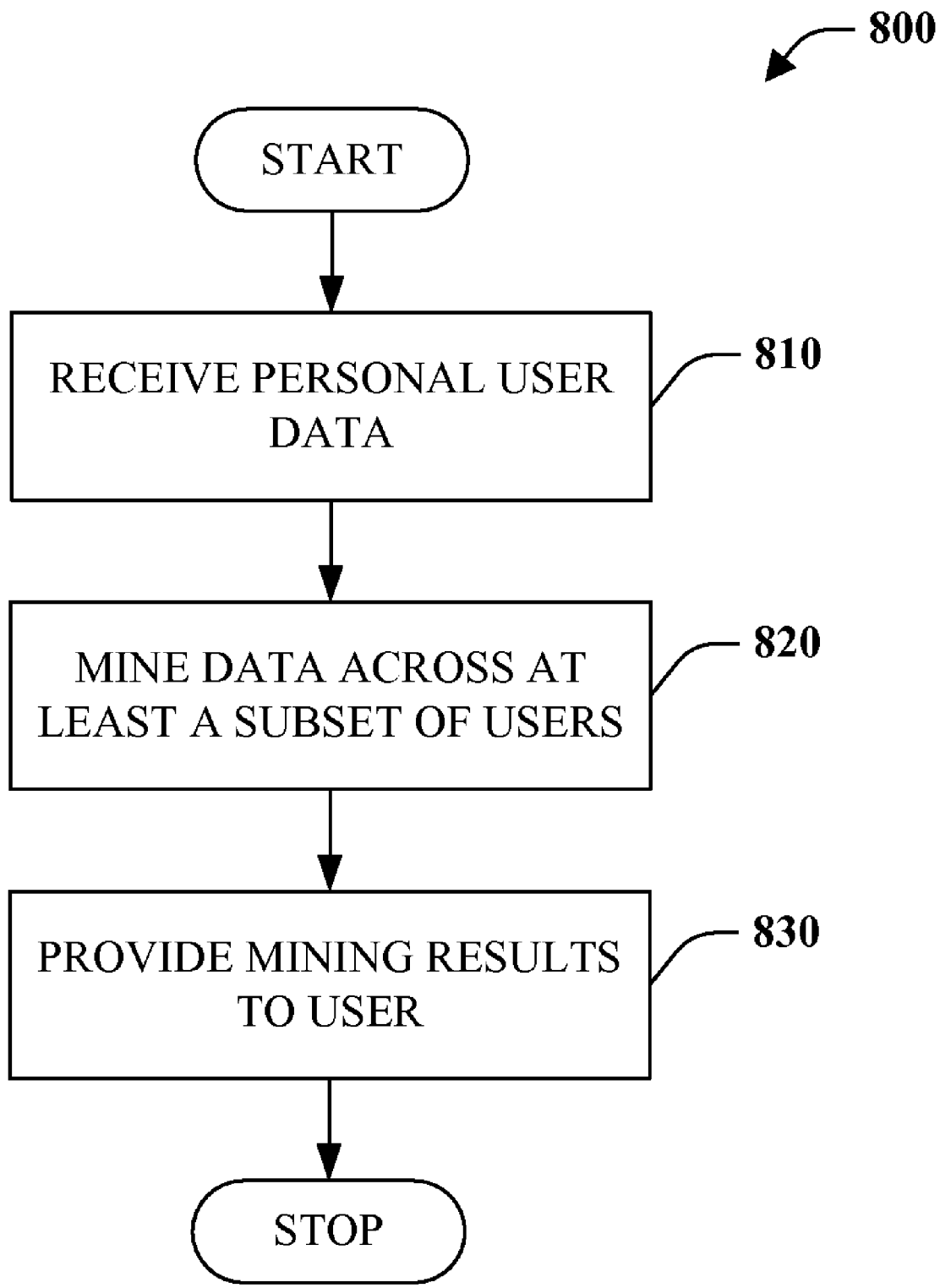
FIG. 8 is a flow chart diagram of a personal data mining method.
Figure 9:
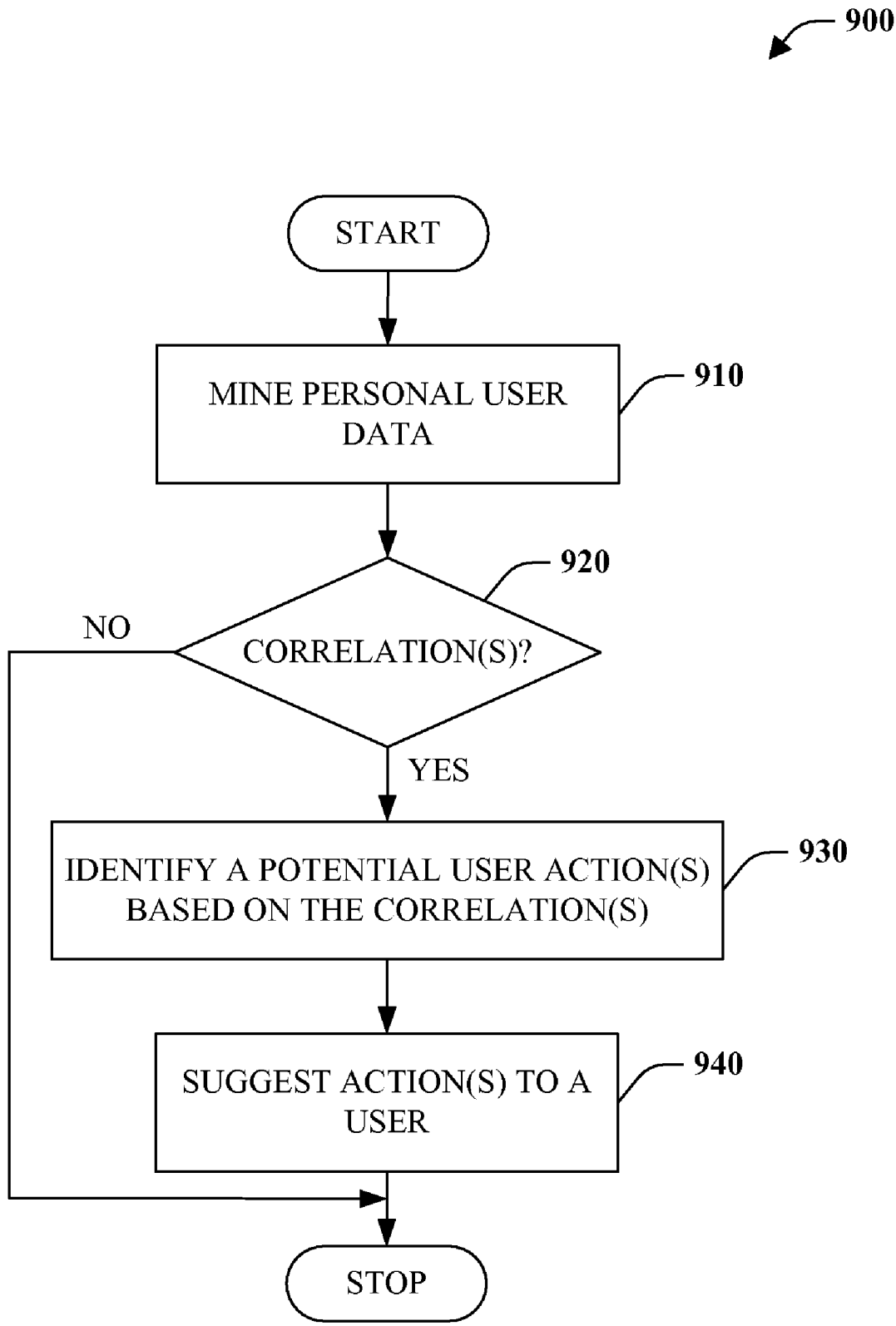
FIG. 9 is a flow chart diagram of a method of provisioning information.
Figure 10:
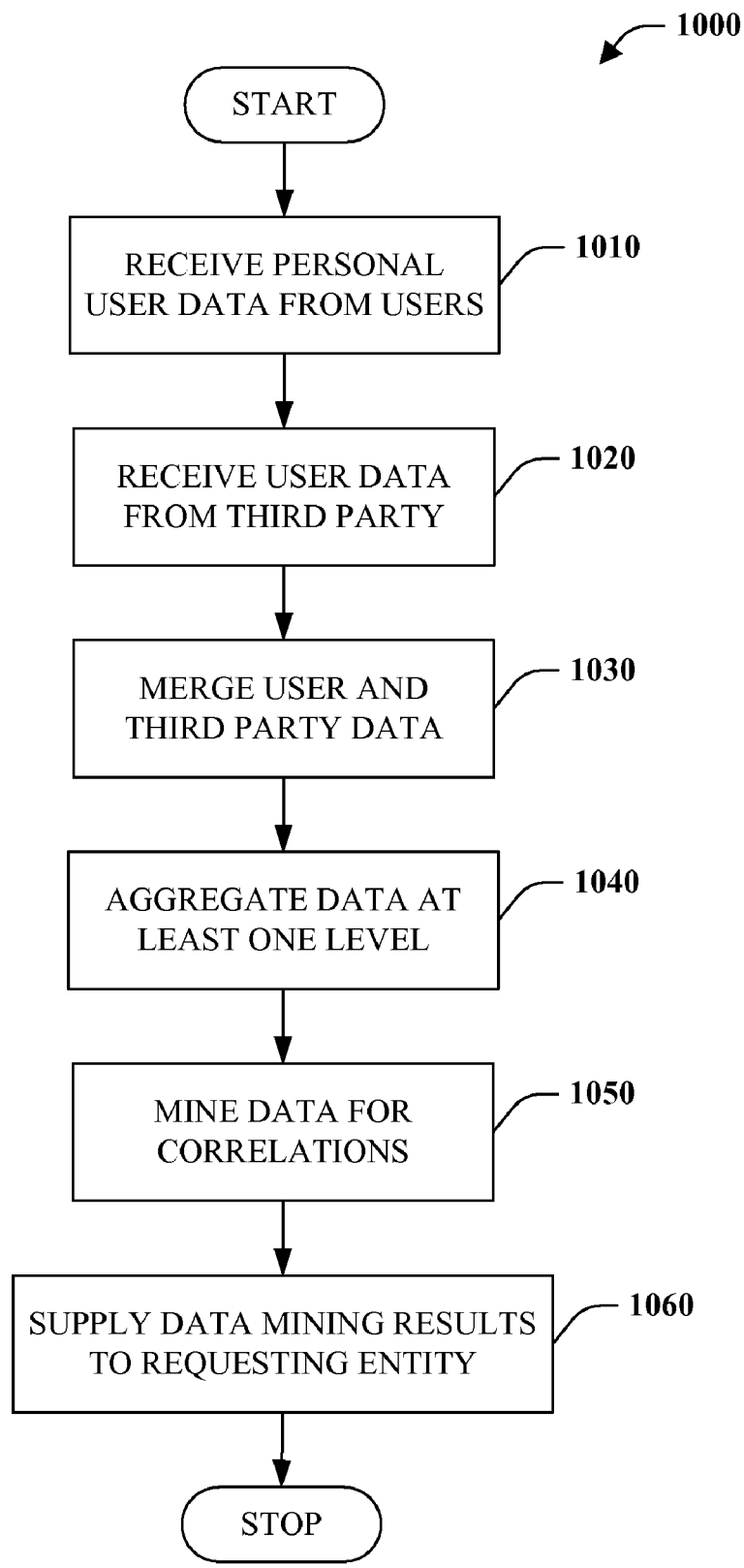
FIG. 10 is a flow chart diagram of a method of data mining.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 8, a method of personal data mining 800 is depicted in accordance with an aspect of the subject disclosure. Method 800 provides actions associated with providing useful information from personal user data associated with more than one user, for instance. At reference numeral 810, personal user data can be received or otherwise obtained. Such data can correspond to personal information management (PIM) data, amongst other data associated with particular users. At numeral 820, at least a subset of the received or retrieved personal user data associated with a plurality of users can be mined to identify patterns, correlations or other previously unknown information. In general, such data mining can be used to achieve a kind of "wisdom of the crowds" effect where data can be aggregated amongst many users to identify trends and patterns and the like. The results of the mining process can be provided to a user at 830. Provisioning of such data can take a myriad of formats including at least one of text, sound, graphics and video. Furthermore, the results can be provided in accordance with either a push (e.g., notification) or pull (e.g., search) model. The results can be utilized by business to better understand markets and/or by individual users or groups of users to improve productivity and/or quality of life.

FIG. 9 illustrates a method of provisioning information 900 in accordance with an aspect of the disclosure. At reference numeral 910, personal user data is mined. For example, data about or concerning a plurality of human beings can be mined in an attempt to discover unknown patterns, relationships and/or correlations amongst data. It should be noted that since the data is personal, users can optionally place restrictions on which data can be mined, by whom and how, among other things. The mining operation can respect these restrictions. Still further yet, the mining operation can execute third-party mining algorithms (e.g., plug-ins) or even user-defined rules. For example, a user can indicate that they would like to be notified if a certain percentage of their friends are all do something similar.

A determination is made at numeral 920 as to whether any correlations or the like are identified by the mining operation of 910. If no, the method simply terminates. If yes, the method continues at 930 where potential user actions are identified or determined based on the one or more correlations, relations or patterns. The results can thus be interpreted or further processed to identify viable user actions in accordance therewith. For instance, if there is a correlation between a user's interests and a particular career, a potential action may correspond to suggesting that the user pursue such a career and possibly identify some steps that others have taken to realize this goal. Furthermore, it might suggest a user take particular college courses or contact particular individuals who act as mentors.

At least one action can be suggested or recommended to a user at reference 940. The suggestions or recommendations can be further filtered by contextual information and/or user specified criteria to facilitate providing the most relevant suggestions or number of suggestions. Additionally or alternatively, suggestions can be ranked based on the strength of the correlations upon which the suggestions are based.

FIG. 10 is a flow chart diagram of a personal data mining methodology 1000 in accordance with an aspect of the disclosure. At reference numeral 1010, personal user data can be received, retrieved or otherwise acquired from at least one user. Data generated by or owned by a particular human being can be included within the class of personal data. Such data can include, without limitation, pictures, movies, email, voicemail, instant messages, word processing documents, spreadsheets, schedules, tasks, roles, profiles, web pages, calendar data and address book data.

Data from one or more third party can be received or otherwise obtained at reference 1020. Third party data can be data collected on behalf of a user by a third party and/or recordings of actions associated with the third party, among other things. Examples of third party data can comprise network accessible information such as that which is public and/or may become public including but not limited to professional memberships/affiliations, professional licenses, driving record, criminal convictions, property ownership, birth certificates, phone logs, purchase records and tax records.

The personal user data obtained from users and third parties can be merged at numeral 1030. More specifically, the user data can be combined, for instance intelligently, to produce a combined set of data. For example, personal data from both users and third parties can be linked to particular individuals and/or identities. It should also be appreciated that time can be associated with this merged data thereby providing a sequence of personal user data.

At numeral 1040, data can be aggregated at one or more levels. Aggregation can provide additional value in particular contexts, such as during mining and data presentation. Furthermore, user privacy can afford at least a degree of protection by utilizing combined or aggregated data rather than data associated with particular individuals.

The data, as prepared, can be mined at reference 1050. Mining can employ various techniques including statistics, classification and machine learning to identity relations, patterns and/or correlations amongst personal user data. For example, a trained data mining model can be applied to the merged and aggregated data.

The results of the mining operation can subsequently be supplied to requesting entities such as users and third parties at reference numeral 1060. The actual results can be filtered by identity or in accordance with privacy policies associated with at least a subset of users. In one instance, results can be supplied view a graphical user interface in accordance with settings and/or through a search. Additionally or alternatively, notifications can be generated and set to individuals including the mined results or interpretations thereof. Optionally, targeted advertisements can be injected within the act of supplying data/information to entities.

As used herein, the terms "component," "system," "service" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The term "entity" is intended to include one or more individuals/users. These users may be associated formally or informally, for instance as a member of a group, organization or enterprise. Alternatively, entities and/or users can be completely unrelated.

A "cloud" is intended to refer to a collection of resources (e.g., hardware and/or software) provided and maintained by an off-site party (e.g., third party), wherein the collection of resources can be accessed by an identified user over a network (e.g., Internet, WAN . . . ). The resources provide services including, without limitation, data storage services, security services, and/or many other services or applications that are conventionally associated with personal computers and/or local servers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
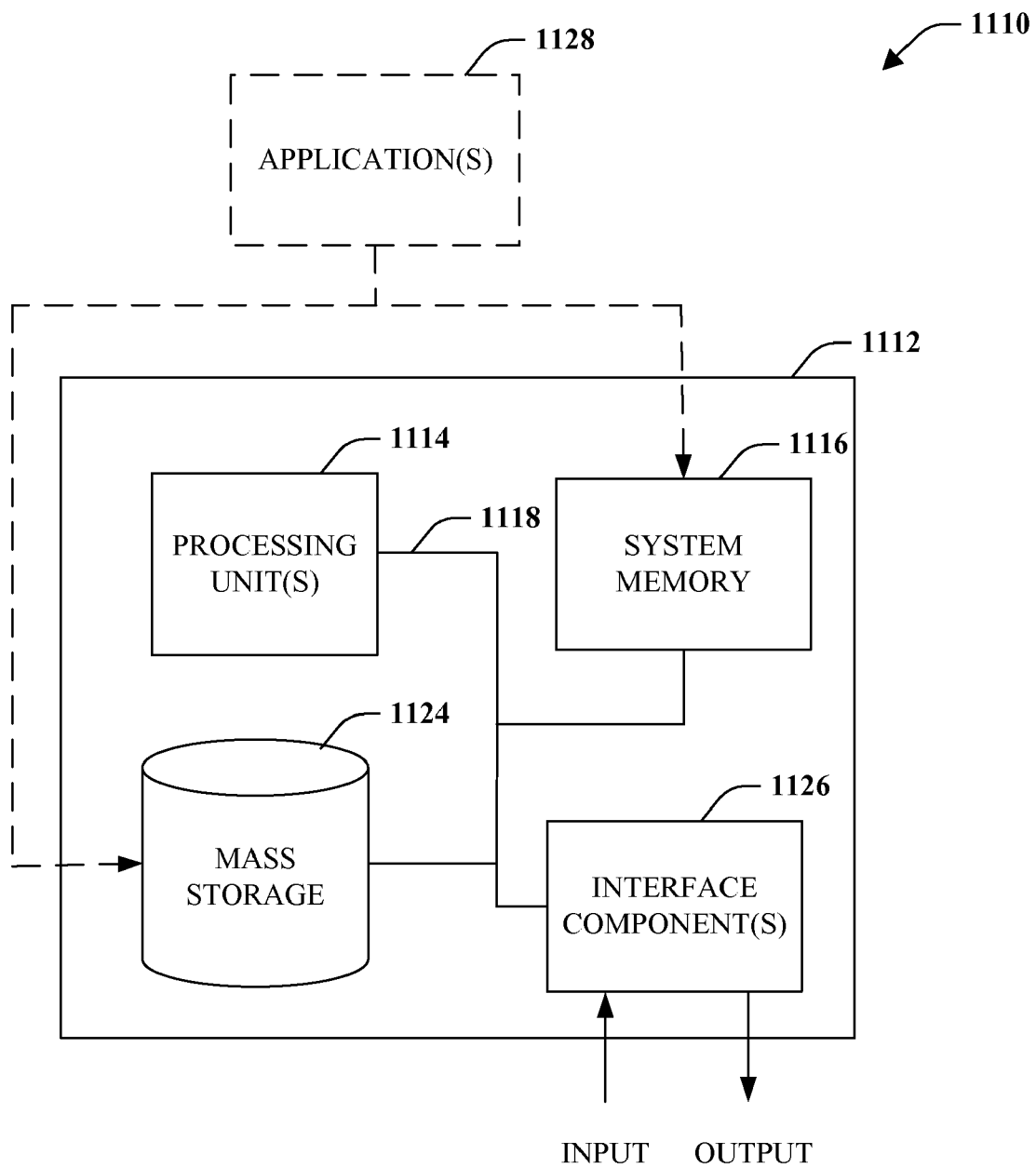
FIG. 11 is a schematic block diagram illustrating a suitable operating environment for aspects of the subject innovation.
Figure 12:
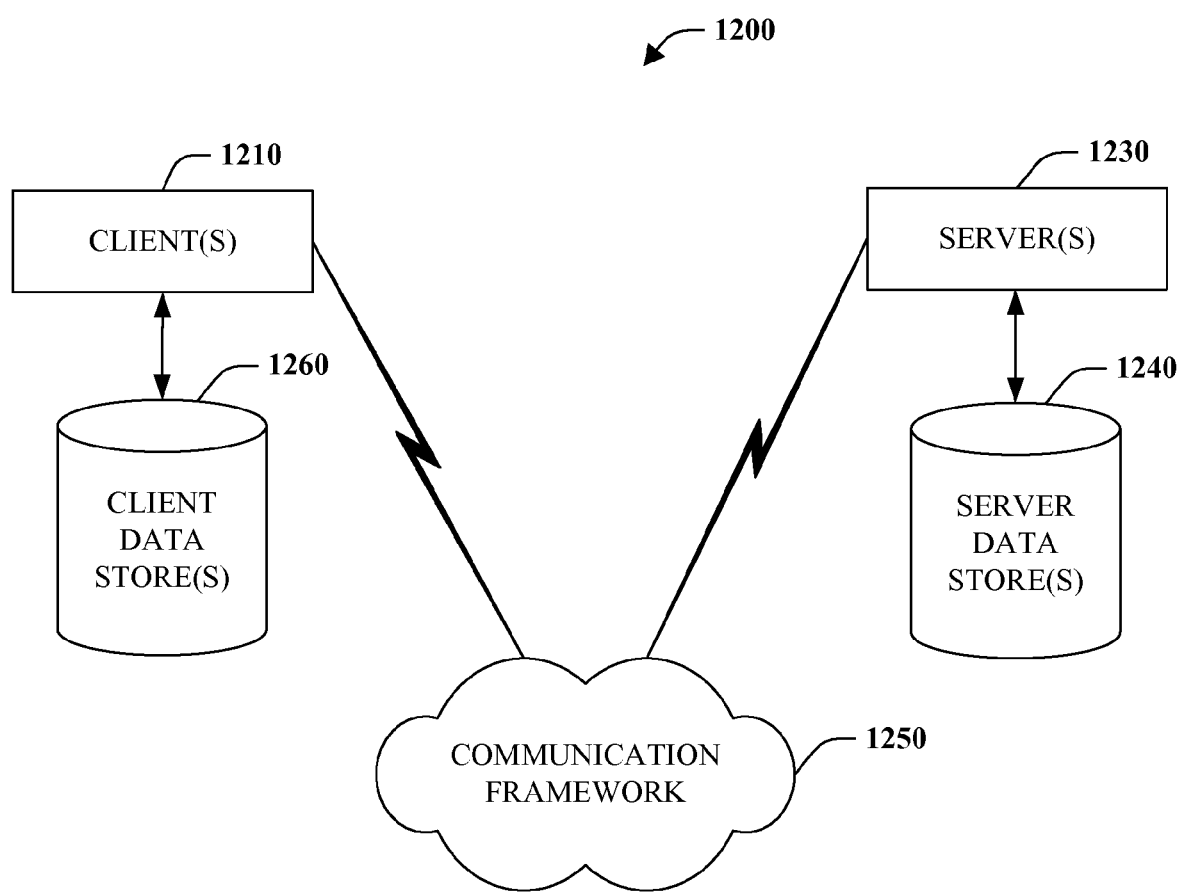
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor, multiprocessor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. Here, the client(s) can correspond to network computing devices and the server(s) can form at least a portion of the cloud. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230. By way of example, the one or more servers 1230 and associated data stores 1240 can form at least part of a cloud for housing data and/or provisioning services in accordance with various aspects of the subject disclosure. Further, the client(s) 1210 and related stores 1260 can correspond to client devices 120 of FIGS. 1 and 2 and in one instance can be thin clients. Further yet, the clients or portions thereof can form part of the network cloud.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A recommendation system, comprising:
   a memory and a processor;
   an application component stored in the memory and executable on the processor that identifies at least one valuable user action based on at least one correlation determined from user data supplied by a plurality of users, the application component identifies individuals who are working on a similar project; and
   a notification component stored in the memory and executable on the processor to generate a notification to at least one of the plurality of users that suggests the action, the notification component suggests the user consult with the individuals.

2. The system of claim 1, the notification component suggests actions that match user defined criteria.

3. The system of claim 1, the application component identifies a repetitive task and the notification component suggests the task be automated.

4. The system of claim 1, further comprising a data mining component stored in the memory and executable on the processor that identifies the at least one correlation from the user data.

5. The system of claim 4, the data mining component is a network service that interacts with remotely persisted user data.

6. The system of claim 4, further comprising a component stored in the memory and executable on the processor that extracts the user data from a device and provides the data to a remote network store accessible by the data mining component.

7. The system of claim 1, further comprising an ad component stored in the memory and executable on the processor that presents one or more advertisements to one of the plurality of users based on the personal data supplied by the user.

8. The system of claim 7, the one or more advertisements are provided in conjunction with the action suggested to a user.

9. The system of claim 1, further comprising a component stored in the memory and executable on the processor that facilitates sale of user information.

10. A personal recommendation method, comprising the following computer-implemented acts:
    mining personal information supplied by a plurality of users to identify at least one correlation amongst the information;
    suggesting one or more actions as a function of the at least one correlation; and
    mining the personal information in accordance with a user defined algorithm.

11. The method of claim 10, further comprising filtering the one or more suggestions based on user defined criteria.

12. The method of claim 10, further comprising mining the personal information utilizing a third-party algorithm.

13. The method of claim 10, further comprising automatically capturing the personal information from one or more user devices.

14. The method of claim 10, further comprising supplying targeted advertisements to users in conjunction with the at least one correlation.

15. A personal recommendation method, comprising the following computer-implemented acts:
    mining personal information supplied by a plurality of users to identify at least one correlation amongst the information;
    suggesting one or more actions as a function of the at least one correlation;
    providing at least a portion of the personal information to one or more advertisers; and
    selling the information to the one or more advertisers and providing at least a portion of the revenue to a user.

16. The method of claim 15, further comprising filtering the one or more suggestions based on user defined criteria.

17. The method of claim 15, further comprising mining the personal information in accordance with a user defined algorithm.

18. The method of claim 15, further comprising mining the personal information utilizing a third-party algorithm.

19. The method of claim 15, further comprising automatically capturing the personal information from one or more user devices.

20. The method of claim 15, further comprising supplying targeted advertisements to users in conjunction with the at least one correlation.

* * * * *